US011599390B2

(12) United States Patent
Hill et al.

(10) Patent No.: US 11,599,390 B2
(45) Date of Patent: Mar. 7, 2023

(54) TRACKING AND MANAGING RESOURCE PERFORMANCE AND MAINTENANCE VIA DISTRIBUTED LEDGERS

(71) Applicant: BANK OF AMERICA CORPORATION, Charlotte, NC (US)

(72) Inventors: Christine Meloro Hill, Charlotte, NC (US); Manu Jacob Kurian, Dallas, TX (US); Lalit Dhawan, Franklin Park, NJ (US); Robert N. Gridley, Milton, GA (US); G. Alister Bazaz, Atlanta, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 343 days.

(21) Appl. No.: 16/831,467

(22) Filed: Mar. 26, 2020

(65) Prior Publication Data

US 2021/0303350 A1 Sep. 30, 2021

(51) Int. Cl.
*G06F 9/50* (2006.01)
*G06F 9/48* (2006.01)

(52) U.S. Cl.
CPC .......... *G06F 9/5011* (2013.01); *G06F 9/4881* (2013.01); *G06F 2209/501* (2013.01); *G06F 2209/508* (2013.01); *G06F 2209/5022* (2013.01)

(58) Field of Classification Search
CPC ................ G06F 9/5011; G06F 9/4881; G06F 2209/501; G06F 2209/5022; G06F 2209/508
See application file for complete search history.

(56) References Cited

U.S. PATENT DOCUMENTS

| | | | |
|---|---|---|---|
| 9,635,006 B2 | 4/2017 | Oz et al. | |
| 9,818,154 B1 | 11/2017 | Wilbert et al. | |
| 10,198,609 B1 | 2/2019 | Tripathy et al. | |
| 10,332,124 B2 | 6/2019 | Avary et al. | |
| 10,332,208 B1 | 6/2019 | Loo et al. | |
| 10,438,037 B1 | 10/2019 | Tripathy et al. | |
| 10,733,160 B1* | 8/2020 | Leise | G06F 16/9024 |
| 10,824,145 B1* | 11/2020 | Konrardy | G06F 30/20 |
| 10,832,214 B1* | 11/2020 | Leise | G06Q 30/018 |
| 11,316,700 B1* | 4/2022 | Michaelis | H04L 45/10 |
| 2006/0143112 A1 | 6/2006 | Donarski et al. | |
| 2014/0279868 A1* | 9/2014 | Astorg | G06Q 30/02 707/741 |
| 2017/0046664 A1 | 2/2017 | Haldenby et al. | |
| 2017/0228731 A1 | 8/2017 | Sheng et al. | |
| 2017/0236094 A1 | 8/2017 | Shah | |

(Continued)

*Primary Examiner* — Benjamin C Wu
(74) *Attorney, Agent, or Firm* — Moore & Van Allen PLLC; Jeffrey R. Gray

(57) ABSTRACT

A network of systems used for tracking of performance of resources and components thereof using resource information. The resource information may include resource performance information (e.g., operation of the resource or components thereof, or the like) that is stored within a distributed computing network. The resource performance information may be compared to resource thresholds and used to determine and distribute resource suggestions for the resource. The distributed computing network may comprise a plurality of nodes that host a distributed register for storing, updating, and allowing access to resources and resource performance information, resource thresholds, and resource suggestions.

17 Claims, 5 Drawing Sheets

(56) References Cited

U.S. PATENT DOCUMENTS

| | | | |
|---|---|---|---|
| 2018/0012311 A1 | 1/2018 | Small et al. | |
| 2018/0018723 A1 | 1/2018 | Nagla et al. | |
| 2018/0096175 A1 | 4/2018 | Schmeling et al. | |
| 2018/0129945 A1 | 5/2018 | Saxena et al. | |
| 2018/0165763 A1 | 6/2018 | Dolle et al. | |
| 2018/0337769 A1 | 11/2018 | Gleichauf | |
| 2018/0374283 A1* | 12/2018 | Pickover | G07C 5/085 |
| 2019/0220861 A1 | 7/2019 | Silver et al. | |
| 2019/0303463 A1 | 10/2019 | Catalano et al. | |
| 2019/0378357 A1 | 12/2019 | Avary et al. | |
| 2020/0101367 A1 | 4/2020 | Tran et al. | |
| 2021/0075611 A1* | 3/2021 | Roongta | H04L 9/3239 |
| 2021/0303349 A1* | 9/2021 | Hill | G06Q 50/30 |
| 2021/0304120 A1* | 9/2021 | Hill | G06F 16/27 |

* cited by examiner

TRACKING AND MANAGING RESOURCE PERFORMANCE AND MAINTENANCE VIA DISTRIBUTED LEDGERS

FIELD OF THE INVENTION

The present disclosure relates to resource tracking, and more particularly to tracking vehicles for maintenance purposes using a distributed register system having a plurality of nodes.

BACKGROUND

Conventional systems are not able to accurately track resources, in particular vehicles, from the initiation of the resource through the life of the resource, including the components of the resource, transfer of the resource, maintenance of the resource, or the like. Without accurate tracking, the valuation of the resources and the tracking of the components used within the resources may not be accurate, and thus, decisions (e.g., maintenance, operation, capabilities, resource transfer, or the like) based on the valuation or the components, may not be made with the correct or most relevant information. Accordingly, there is a need to provide improved resource tracking for various purposes.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for a network of systems used for tracking of performance of resources and components thereof using resource information. The resource information may include resource performance information (e.g., operation of the resource or components thereof, or the like) that is stored within a distributed computing network. The resource performance information may be compared to resource thresholds and used to determine and distribute resource suggestions for the resource. The distributed computing network may comprise a plurality of nodes that host a distributed register for storing, updating, and allowing access to resources and resource performance information, resource thresholds, and resource suggestions.

Embodiments of the invention comprise systems, computer implemented methods, and computer program products for tracking resource performance of resources. The invention comprises receiving a performance request from a node of a plurality of nodes within a distributed register system and identifying a resource identifier for a resource. Moreover, a resource suggestion is identified based on the performance request and resource information for the resource stored on a distributed register of the distributed register system based on the resource identifier. A notification is provided for the resource suggestion and the resource information to an interface of an entity system. The distributed register of the distributed register system stores resource information from initiation of the resource throughout a life of the resource to verify resource information about the resource for access by a plurality of entities.

In further accord with embodiments of the invention, the resource is a vehicle and the resource identifier is a vehicle identification number (VIN).

In other embodiments of the invention, the performance request is made by an entity through an entity system.

In yet other embodiments of the invention, the performance request is made directly by the resource through a resource system.

In still other embodiments of the invention, the performance request comprises a request to monitor performance of the resource or a component thereof.

In other embodiments of the invention, the request to monitor the performance of the resource or the component thereof, comprises monitoring the performance over a specific time period.

In further accord with embodiments of the invention, identifying the resource suggestion comprises identify the resource information stored in the distributed register based on the performance request and identifying a performance threshold for the resource or component of the resource. Thereafter, the resource information is compared to the performance threshold, and the resource suggestion is determined based on the comparison of the resource information to the performance threshold.

In other embodiments of the invention, the resource is a vehicle and the resource information is the use of the vehicle or the component of the vehicle, wherein the performance threshold defines when the resource or the component requires replacement or maintenance, and wherein the notification is provided when the resource information meets the performance threshold.

In yet other embodiments, the invention further comprises automatically ordering a replacement component or scheduling maintenance for the resource.

In still other embodiments, the replacement component is automatically ordered, and the replacement component is determined based on the resource information stored for the component of the resource.

In other embodiments of the invention, when the replacement component is automatically ordered a plurality of entities are searched within the distributed register system for optimizing the ordering of the replacement component.

In further accord with embodiments of the invention, scheduling the maintenance for the resource comprises searching a plurality of entities within the distributed register system for optimizing the identification of a maintenance entity for scheduling maintenance for the resource.

In other embodiments of the invention, the performance request is one of a plurality of performance requests, and wherein the plurality of performance requests occur automatically over a specified time period.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
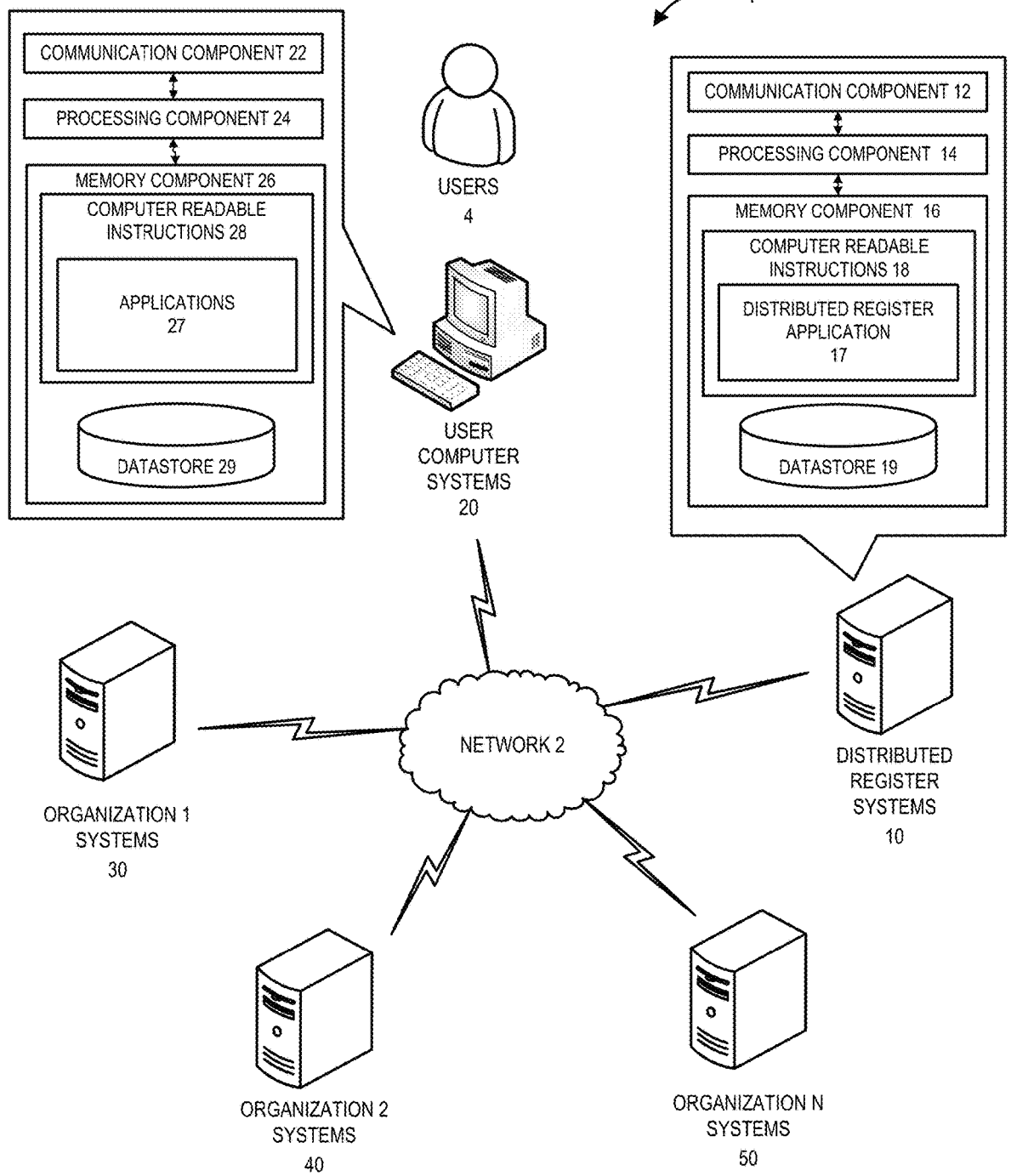

Having thus described embodiments of the invention in general terms, reference will now be made to the accompanying drawings, wherein:

FIG. 1 illustrates a distributed computing network, in accordance with embodiments of the present disclosure.

Figure 2:
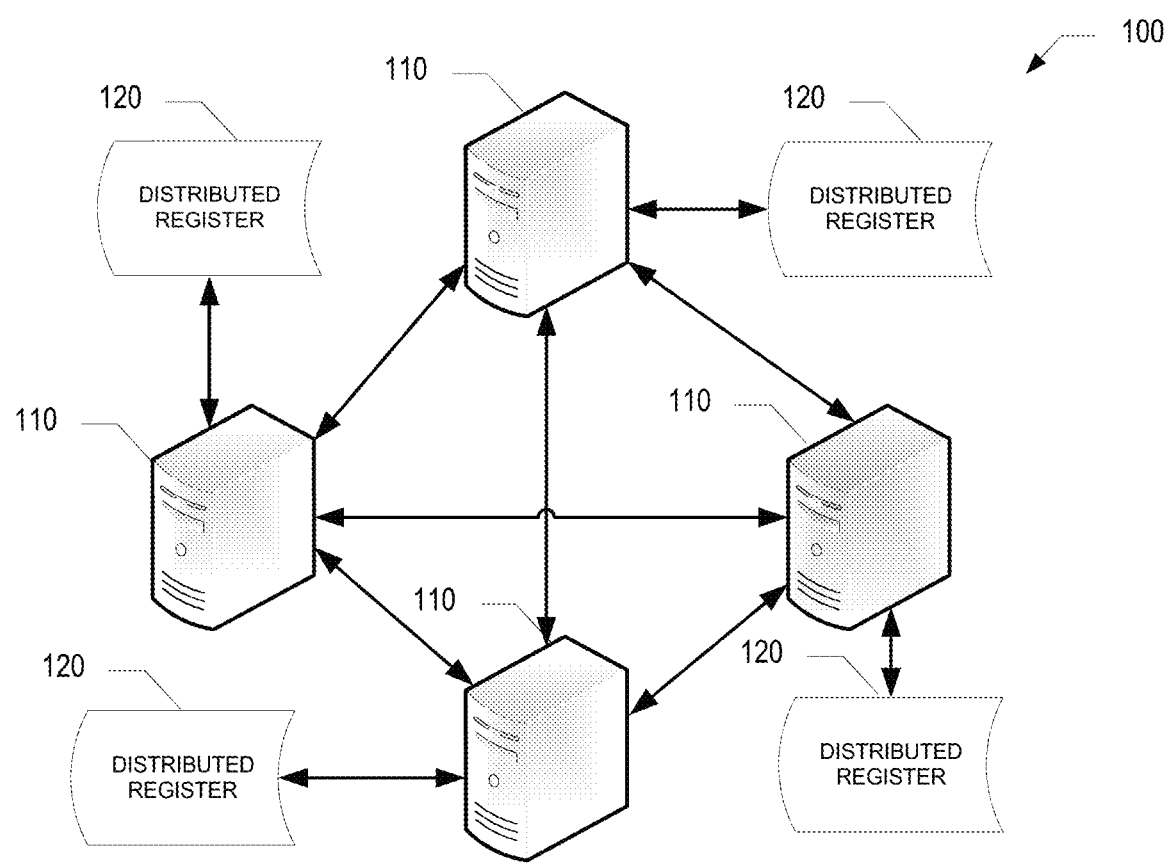

FIG. 2 illustrates a block diagram for the distributed computing network with decentralized nodes that store a distributed register, in accordance with embodiments of the present disclosure.

Figure 3:
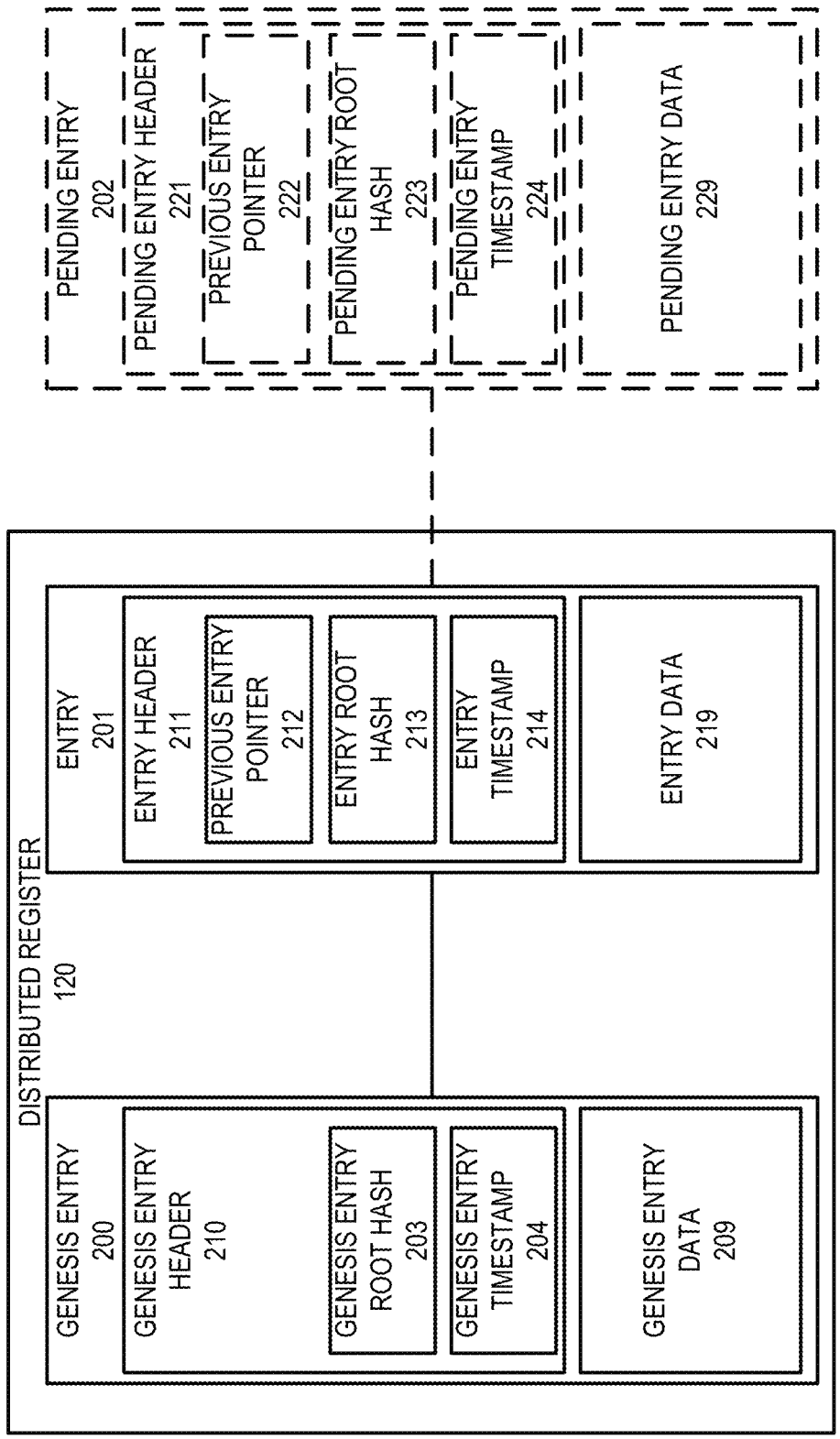

FIG. 3 illustrates a block diagram for entries within a representative distributed register of the distributed computing network, in accordance with embodiments other present disclosure.

Figure 4:
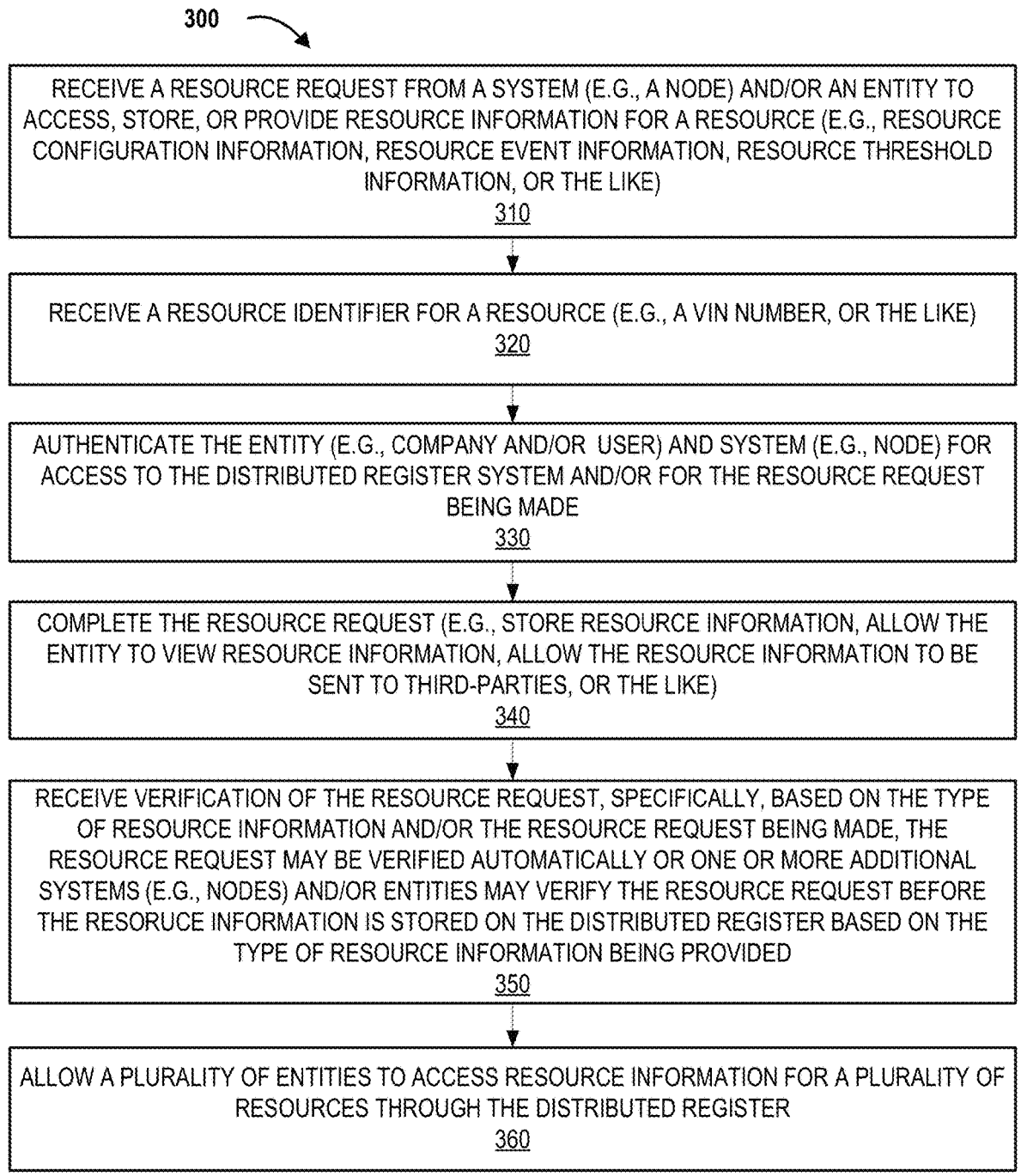

FIG. 4 illustrates a process flow for a resource request and tracking process within the distributed computing network, in accordance with embodiments of the present disclosure.

Figure 5:
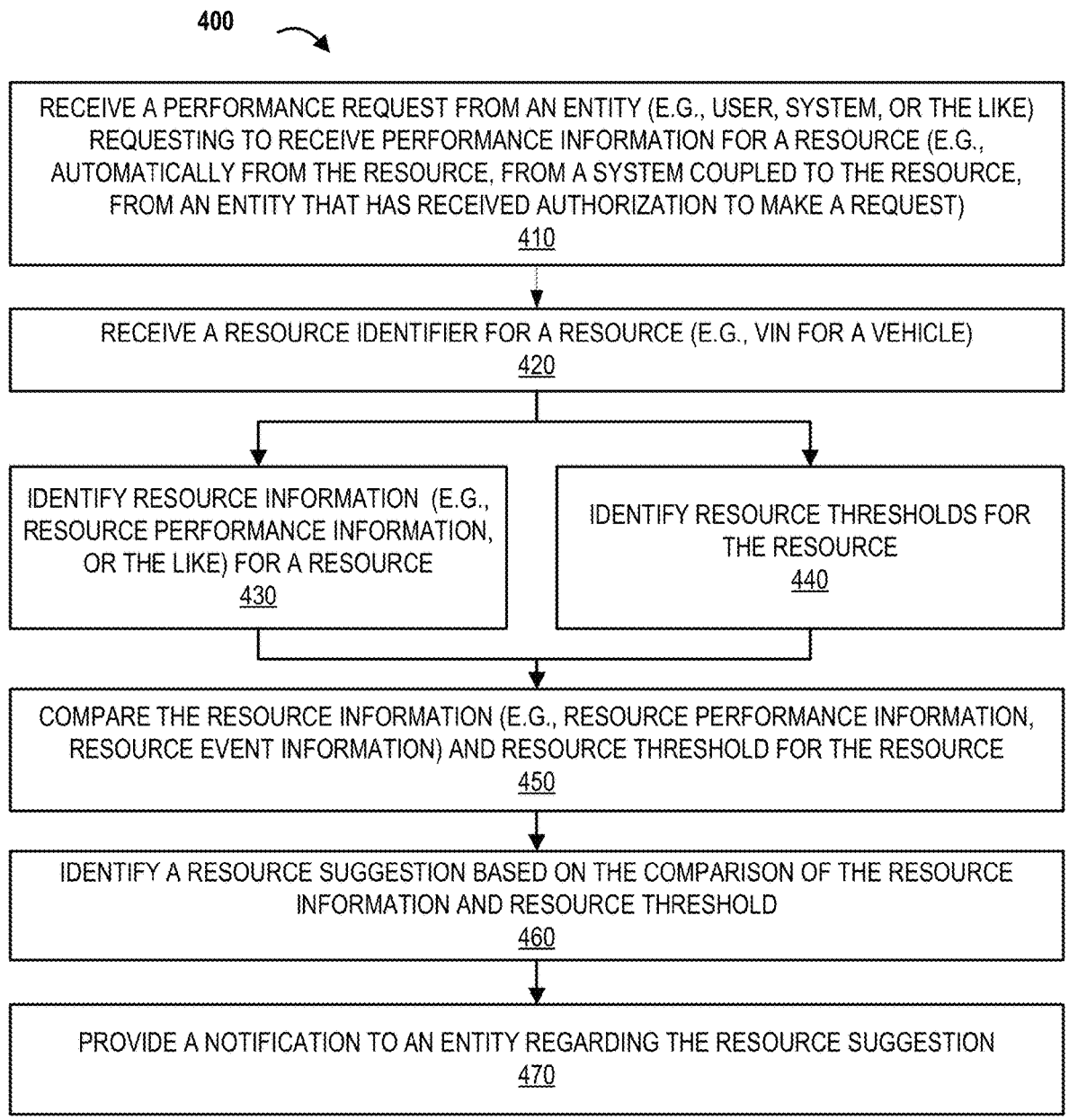

FIG. 5 illustrates a process flow for a resource tracking and suggestion process within the distributed computing network, in accordance with embodiments of the present disclosure.

DETAILED DESCRIPTION OF EMBODIMENTS OF THE INVENTION

Embodiments of the present disclosure provide a network of systems for tracking of resources and components thereof using resource information. The resource information may include resource event information (e.g., resource maintenance for the resource or components thereof, transfer, or the like), resource configuration information (e.g., brand, model, manufacturer, mileage, registration, identification information, or the like), resource performance information (e.g., operation of the resource, resource thresholds, or the like) that is stored within distributed computing network. The distributed computing network may comprise a plurality of nodes that host a distributed register for storing, updating, and allowing access to resources and resource information thereof, such as resource events and resource event information, resource configuration information, resource performance, resource thresholds, resource suggestions, and/or the like. The plurality of nodes may be owned and/or operated by one or more entities (e.g., users, organizations, combinations thereof) for various purposes, as will be discussed herein. Accordingly, the data within the distributed register may comprise resource information related to the configuration of the resources, maintenance of the resources, operation of the resources, performance of the resources, and/or the like, and/or the processes of the various entities that have an interest in the resources or components thereof.

FIG. 1 illustrates a distributed computing network 1, in accordance with embodiments of the invention. As illustrated in FIG. 1, distributed register systems 10 are operatively coupled, via a network 2, to one or more user computer systems 20, organization 1 systems 30, organization 2 systems 40, organization N systems 50 (e.g., any number of other organization systems), or other like systems. It should be understood that the distributed register systems 10 may comprise the systems that are utilized to manage the distributed computing network 1. It should be further understood that the nodes of the distributed computing network 1 may be each individual distributed register system 10. The user computer systems 20, or a portion thereof, may also be nodes of the distributed computing network 1 (e.g., may be a system of the distributed register systems 10). Alternatively or additionally, the user computer systems 20 may be associated with individual organizations (e.g., organization 1, organization 2, organization N, which may be companies, individual users, or the like), or may be part of an organization system 20, 30, 50. The user computer systems 20 may access nodes of the distributed register systems 10 on behalf of an entity (e.g., organizations, individual users, or the like). Furthermore, the organization systems 30, 40, 50, or a portion thereof, may be nodes of the distributed register systems 10. Alternatively, or additionally, the user computer systems 20 and/or the organization systems 30, 40, 50 may not be nodes (e.g., not a part of the distributed register systems 10, and instead are used merely to operate the organization systems and/or access the distributed register systems 10. Consequently, the distributed register systems 10 may be separate systems that are nodes for the distributed computer network 1 and/or in some embodiments may include the user computer systems 20 and/or organization systems 30, 40, 50, or a portion thereof as nodes. As such, regardless of whether or not the user computer systems 20 are nodes, the users 4 may utilize the user computer systems 20 to access, store, distribute, or the like resource information related to resources on a distributed register, as will be described in further detail herein. In some embodiments, the distributed register systems 10 may be private distributed register systems, public distributed register systems, or hybrid distributed register systems (public and private distributed register systems), which will be described in further detail herein.

The network 2 may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the distributed register systems 10 generally comprise one or more communication components 12, one or more processing components 14, and one or more memory components 16. The one or more processing components 14 are operatively coupled to the one or more communication components 12 and the one or more memory components 16. As used herein, the term "processing component" or "processor" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the user computer systems 20, the organization 1 systems 30, the organization 2 systems 40, the organization N systems 50, or other like systems. As such, the one or more communication components 12 generally comprise a wireless transceiver, modem, server, electrical connection, electrical circuit, or other component for electronically communicating with other components on the network 2. The one or more communication components 12 may further include an interface that accepts one or more network interface cards, ports for connection of network components, Universal Serial Bus (USB) connectors and the like.

As further illustrated in FIG. 1, the distributed register systems 10 comprise computer-readable instructions 18 stored in the memory component 16, which in one embodiment includes the computer-readable instructions 18 of the distributed register application 17. In some embodiments, the one or more memory components 16 include one or more data stores 19 for storing data related to the distributed register systems 10, including, but not limited to, data created, accessed, and/or used by the distributed register application 17.

It should be understood that the distributed register systems 10, and the components therein, may be one or more private distributed registers, one or more public distributed registers, and/or one or more hybrid distributed registers.

The distributed register systems 10 and distributed register application 17, as will be described in further detail herein, may allow for resource tracking (e.g., vehicle tracking, or the like), such as for tracking of resource events (e.g., sales, damage, repairs, maintenance, upgrades, or the like), resource configurations (e.g., components, packages, mileage, model, make, or the like), and for the determination of resource suggestions (e.g., recommended maintenance, or the like) based on resource performance and resource thresholds (e.g., stored requirements for resource events). As explained in further detail later the distributed register systems 10 may be located in or associated with the other systems described herein.

As illustrated in FIG. 1, users 4 may access the distributed register application 17 on the one or more distributed systems 10, or a portion thereof stored on other systems (e.g., a portion of the distributed application 17 stored on other user computer systems 20 or on the organization systems 30, 40, 50), or through other applications, through the user computer systems 20. The user computer system 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the distributed register systems 10, the organization 1 systems 30, the organization 2 systems 40, the organization N systems 50, or other systems. As such, the one or more communication components 22 generally comprise a wireless transceiver, modem, server, electrical connection, or other component for communicating with other components on the network 2. The one or more communication components 12 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 of applications 27, such as dedicated applications (e.g., apps, applet, or the like), portions of dedicated applications, web browser or other apps that allow access to applications located on other systems, or the like. As previously discussed, the distributed register application 17, or a portion thereof, may be stored on one or more of the user computer systems 20.

In some embodiments the user computer system 20 may be operatively coupled to a resource in order to become a resource system (e.g., capture information from the resource and transfer the information). For example, the user computer system 20 may connect to the resource through a wire or communicate wirelessly with the resource. Additionally, or alternatively, the user computer system 20 may be a resource system that is integral within the resource, and thus, have the same components as described with respect to the user computer system 20. As such, in some embodiments the resource may communicate directly with other systems on the distributed computing network 1. Consequently, in some embodiments the resource system may be a node within the distributed computing network 1.

As illustrated in FIG. 1, the organization 1 systems 30, the organization 2 systems 40, the organization N systems 50, or other systems are operatively coupled to the distributed register systems 10 and/or user computer systems 20, through the network 2. These systems have components that are the same as or similar to the components described with respect to the distributed register systems 10 and/or user computer systems 20 (e.g., one or more communication components, one or more processing components, and one or more memory devices with computer-readable instructions of one or more applications, one or more datastores, or the like). Thus, the organization 1 systems 30, the organization 2 systems 40, the organization N systems 50, or other systems communicate with the distributed register systems 10, the user computer systems 20, and/or each other in same or similar way as previously described with respect to the distributed register systems 10 and/or the user computer systems 20. The organization systems 30, 40, 50 may be made up of one or more user systems 20, one or more of the distributed systems 10, or portions of any of the foregoing systems, and as such may act as nodes (explained in further detail with respect to FIG. 2) which are utilized to store, allow access to, disseminate, validate, or the like resource information.

FIG. 2 provides a block diagram of the distributed computing network with decentralized nodes 100, illustrating how a distributed computing network 1 operates. Rather than utilizing a centralized database to store, disseminate, and/or validate information, the present invention utilizes a decentralized distributed register configuration or architecture, as shown in FIG. 2 in one aspect of the invention, in order to allow users to access, store, disseminate, validate, or the like resource information of resource. Such a decentralized distributed register configuration ensures accurate mapping and validation of stored resource information and provides a secured network over which information may be validated. Accordingly, distributed register configurations may be utilized with respect to any type of resource information by maintaining an accurate register of information. As will be described in further detail herein the resources may be any type of equipment, but in some particular embodiments may be vehicles (e.g., cars, trucks, boats, aircraft, or the like). Moreover, the resource information may be resource configuration information (e.g., component packages, mileage, make, model, or the like), resource event information (e.g., sales, maintenance, damages, accidents, inspections, or the like), and resource performance (e.g., operation of the resources) and resource thresholds (e.g., life of components, performance of the components, schedule maintenance dates, or the like), which in particular embodiments may be related to vehicles.

A distributed register, as described herein, is a distributed database that maintains a list of data records, the security of which is enhanced by the distributed nature of the register. The distributed register may also be described as a distributed ledger or distributed block chain. As described herein, a distributed register typically includes several nodes, which may be one or more entities (e.g., individual users, organizations or the like), systems of an entity (e.g., machines, computers, databases, data stores or the like) operably connected with one another. For example, the various systems described with respect to FIG. 1, or systems within the systems described with respect to FIG. 1 may be the nodes. In some aspects of the invention, an entity system may be a node of a block chain, and internal or external users 4 may access the entity systems (e.g., user computer systems 20, organization systems 30, 40 50, or the like) in order to take actions with respect to the resources. In other aspects of the invention, each of the nodes or multiple nodes are maintained by different entities, or components within an entity, and as such different systems within an entity or between entities may act as nodes. A distributed register typically works without a central repository or single administrator, however, as discussed in the present invention a network of nodes within a single entity or group of entities may together serve as a central repository or single administrator that can control access to the distributed register that is associated with a plurality of different nodes. One application of a distributed register is a public register for transactions for cryptocurrencies. In this use of a distributed register, the data records recorded in the distributed register are enforced cryptographically and stored on the nodes of the distributed register.

A distributed register provides numerous advantages over traditional databases. For example, with respect to utilizing a distributed register for resource tracking, a large number of nodes of a distributed register block may reach a consensus regarding the validity of a resource contained on a decentralized register. Similarly, when multiple versions of resource information exist on the register, multiple nodes can converge on the most up-to-date version of the resource information. For example, in the case of resource tracking, any node within the distributed register that stores or validates the resource information, can determine within a level of certainty whether the resource information is correct and become final by confirming that no conflicting resource information (e.g., the same resource identifier having different resource information) is confirmed by the distributed register elsewhere on other nodes.

The distributed register typically has two primary types of records. The first type is the information type (e.g., resource information, such as the resource event information, resource configuration information, resource performance information, resource threshold information, or the like), which consists of the actual data stored in the distributed register. The second type is the register type, which are records that confirm when and in what sequence certain information (e.g., resource information, or the like) became recorded as part of the distributed register. Information (e.g., resource information, or the like) is created by users using the distributed register in its normal course of business, for example, when someone records a maintenance event for the vehicle, register entries may be created by users known as "miners" who use specialized software/equipment to create the register entries for the event. Users of the distributed register create blocks for the information (e.g., resource information, or the like), which is passed around to various nodes of the distributed register. Valid information is one that can be validated based on a set of rules that are defined by the particular system implementing the distributed register. For example, in the case of cryptocurrencies, a valid transaction is one that is digitally signed, spent from a valid digital wallet and, in some cases, meets other criteria. In the present invention, valid information may also be one that is digitally signed, sent from a valid node, may be verified by multiple entities (e.g., vehicle component supplier, vehicle maintenance provider, or the like). In some distributed register systems, miners are rewarded to create register entries by a reward structure that offers a pre-defined per-register entry reward and/or payments offered within the validated entries (e.g., for individual transactions). Thus, when a miner successfully validates an interaction on the distributed register, the miner may receive rewards and/or payments as a benefit to continue creating new register entries. In the present disclosure the payments may be made when funds are transferred (e.g., when the vehicle changes hands, when maintenance is performed, or the like) between entities.

As mentioned above and referring to the distributed network of nodes 100 of FIG. 2, the distributed register is typically decentralized—meaning that a distributed register component 120 (i.e., a decentralized register) is maintained on multiple nodes 110 of the distributed network of nodes 100. One node 110 in the distributed register may have a complete or partial copy of the entire register or set of information (e.g., resource information, or the like) and/or register entries on the distributed register 120. Information (e.g., resource information, or the like) is initiated at a node 100 of a distributed register 120 and communicated to the various other nodes 110 of the distributed network of nodes 100. Any of the nodes 110, or users 4 of the nodes 110, which have access to the distributed register 120 to validate the information, add the information to its copy of the distributed register 120, and/or provide the resource information (e.g., resource event information, resource configuration information, resource performance and resource thresholds, or the like), the resource information validation (in the form of a register entry) and/or other data to other nodes 110. This other data may include time-stamping, such as is used in cryptocurrency distributed registers.

In various aspects, the distributed register may be configured with a set of rules (otherwise described herein as "limits") to dictate what actions may be taken by an entity (e.g., users 4, organizations, or the like) and/or nodes 110 for various information, how information may be accessed, created, stored, disseminated, and/or validated, and/or how the network communicates information throughout the one or more distributed registers 120 across the nodes 110. In some aspects of the disclosure, the rules dictate that an originating node (i.e., a node through which an interaction or information submission was initiated) must approve all actions for resource information mapped to that node 120. In some aspects of the disclosure, the rules dictate that some or all actions for resource information may be approved by one or more validator nodes without further input from the originating node. In some such cases, the rules dictate that additional information is needed in determining whether an action for resources should be approved. In other aspects, the validating node must reach out to the originating node in certain situations as dictated by the rules. For example, if the action for the resource, such as validating a transfer of a vehicle, is in any way indicated to be a faulty or invalid (due to some information present on the distributed register), then the rules may dictate that the validating node communicate with the originating node to confirm or deny validation of the resource event.

In some aspects of the disclosure, the validator may approve the resource event (e.g., resource information, or the like) without communicating with the originating node. In such a case, the validator (or a group or all of validators if multiple or universal validations, respectively, are required by the rules), can approve the action for the resource based solely on the information contained in the distributed register. Thus, if an action for a resource is requested and a validator receives the action for the resource, it can check the actions for the resource against its register to determine whether an originating node has validated the resource event. If so, then the validator may approve the action for the resource. In this regard, the action for the resource may be approved very quickly, and in some cases, in real-time or near real-time.

In various aspects, any of the nodes 110 illustrated in FIG. 2, may be a validator or a miner that validates resource information. In some aspects of the disclosure, a number of the nodes 110 must validate resource information in order for the resource information to be approved. For example, in one embodiment, two or three nodes 110 must validate the authenticity of resource information, or portions thereof, before the resource information may be approved. As noted above, in some instances, the rules of the distributed register and/or rules specific to particular originating nodes or validator nodes dictate that validator nodes cannot approve actions without confirming available information (e.g., funds used in an interaction, correct component has been installed, electronic paperwork has been recorded on a register, or the like). In some cases, the available information is already associated with another entity on the distributed register, but in other cases, the validator node on the distributed register must communicate with the originating nodes in order to request approval for the resource information.

In some aspects of the disclosure, the rules may only be changed by the originating node (maintained by an originating entity or entities that control the distributed register) to ensure the validity of a change to a rule. In some cases, particularly in cases where one or more nodes have raised a concern that resource information is not valid, the originating node may be contacted for verification of the resource information.

In various aspects, resource information is stored and executed from one or more systems and is not placed on the public distributed register itself, and instead is located on a private portion of the distributed register (e.g., account information related to the transfer of funds). In some aspects of the disclosure, the resource event, or resource information for the event, is only stored and executed from a subset of the nodes of the distributed register, which, in some aspects, are synonymous with validator nodes and in other aspects are not synonymous with the validator nodes. In some aspects, placeholder(s) for the resource information, or the like, indicating that the resource information exists and is accessible within a private distributed register may be placed on the public distributed register (e.g., an indication that funds were transferred, but not the amount of the funds). In some cases, the resource information may be executed only by the designated one or more nodes (e.g., on the private distributed register, or on a private portion of a distributed register). Such systems may utilize a key or other security mechanism(s) in order to ensure only certain nodes are allowed access to the information related to the private distributed register portion. In some cases, this configuration may result in additional security instead of placing the event on the public distributed register for any node to execute.

FIG. 3 is a distributed register entry diagram illustrating the data structures within an exemplary distributed register, in accordance with some embodiments. In particular, FIG. 3 depicts a plurality of entries 200, 201 within the distributed register 120, in addition to a pending entry 202 that has been submitted to be appended to the distributed register 120. The distributed register 120 may comprise a genesis entry 200 that serves as the first entry and origin for subsequent entries in the distributed register 120. The genesis entry 200, like all other entries within the distributed register 120, comprises an entry header 210 and entry data 209. The genesis entry data 209, or any other instances of entry data within the distributed register 120 (or any other distributed register 120 located on other nodes) may contain one or more data records for the resource information. For instance, entry data may comprise software source code, authentication data, transaction data, documents or other data containers, third party information, regulatory and/or legal data, or the like.

The genesis entry header 210 may comprise various types of metadata regarding the genesis entry data 209. In some embodiments, the entry header 201 may comprise a genesis entry root hash 203, which is a hash derived from an algorithm using the genesis entry data 209 as inputs. In some embodiments, the genesis entry root hash 203 may be a Merkle root hash, wherein the genesis entry root hash 203 is calculated via a hash algorithm based on a combination of the hashes of each data record within the genesis entry data 209. In this way, any changes to the data within the genesis entry data 209 will result in a change in the genesis entry root hash 203. The genesis entry header 201 may further comprise a genesis entry timestamp 204 that indicates the time at which the entry was written to the distributed register 120. In some embodiments, the timestamp may be a Unix timestamp. In some embodiments, particularly in distributed registers utilizing a PoW consensus mechanism, the entry header 210 may comprise a nonce value and a difficulty value. The nonce value may be a whole number value that, when combined with the other items of metadata within the entry header 210 into a hash algorithm, produces a hash output that satisfies the difficulty level of the cryptographic puzzle as defined by the difficulty value. For instance, the consensus mechanism may require that the resulting hash of the entry header 210 falls below a certain value threshold (e.g., the hash value must start with a certain number of zeroes, as defined by the difficulty value).

A subsequent entry 201 may be appended to the genesis entry 200 to serve as the next entry in the distributed register 120. Like all other entries, the subsequent entry 201 comprises an entry header 211 and entry data 219. Similarly, the entry header 211 comprises an entry root hash 213 of the data within the entry data 219 and an entry timestamp 214. The entry header 211 may further comprise a previous entry pointer 212, which may be a hash calculated by combining the hashes of the metadata (e.g., the genesis entry root hash 203, genesis entry timestamp 204, and the like) within the entry header 201 of the genesis entry 200. In this way, the entry pointer 212 may be used to identify the previous entry (e.g., the genesis entry 200) in the distributed register 120, thereby creating a "chain" comprising the genesis entry 200 and the subsequent entry 201.

The value of a previous entry pointer is dependent on the hashes of the entry headers of all of the previous entries in the chain; if the entry data within any of the entries is altered, the entry header for the altered entry as well as all subsequent entries will result in different hash values. In other words, the hash in the entry header may not match the hash of the values within the entry data, which may cause subsequent validation checks to fail. Even if an unauthorized user were to change the entry header hash to reflect the altered entry data, this would in turn change the hash values of the previous entry pointers of the next entry in the sequence. Therefore, an unauthorized user who wishes to alter a data record within a particular entry must also alter the hashes of all of the subsequent entries in the chain in order for the altered copy of the distributed register to pass the validation checks imposed by the consensus algorithm. Thus, the computational impracticability of altering data records in a distributed register in turn greatly reduces the potential for improper alteration of data records.

A pending entry 202 or "proposed entry" may be submitted for addition to the distributed register 120. The pending entry 202 may comprise a pending entry header 221, which may comprise a pending entry root hash 223, a previous entry pointer 222 that points to the previous entry 201, a pending entry timestamp 224, and pending entry data 229. Once a pending entry 202 is submitted to the system, the nodes within the system may validate the pending entry 202 via a consensus algorithm. The consensus algorithm may be, for instance, a proof of work mechanism, in which a node determines a nonce value that, when combined with a hash of the entry header 211 of the last entry in the distributed register, produces a hash value that falls under a specified threshold value. For instance, the PoW algorithm may require that said hash value begins with a certain number of zeroes. Once said nonce value is determined by one of the nodes in the distributed register, the node may post the "solution" to the other nodes in the distributed register. Once the solution is validated by the other nodes, the hash of the entry header 211 is included in the pending entry header 221 of the pending entry 202 as the previous entry pointer 222. The pending entry header 221 may further comprise the pending entry root hash 223 of the pending entry data 229 which may be calculated based on the winning solution. The pending entry 202 is subsequently considered to be appended to the previous entry 201 and becomes a part of the distributed register 120. A pending entry timestamp 224 may also be added to signify the time at which the pending entry 202 is added to the distributed register 120.

In other embodiments, the consensus mechanism may be based on a total number of tallies submitted by the nodes of the distributed register 120 (e.g., a PBFT consensus mechanism). Once a threshold number of tallies to validate the pending entry 202 has been reached, the pending entry 202 may be appended to the distributed register 120. In such embodiments, nonce values and difficulty values may be absent from the entry headers. In still other embodiments, the consensus algorithm may be a Proof-of-Stake mechanism in which the stake (e.g., amount of payment, reputation value, or the like) may influence the degree to which the node may participate in consensus and select the next proposed entry. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 4 presents a flow diagram for making resource requests and tracking resource information 400 for a resource, wherein the resource is a vehicle. As illustrated by block 310 of FIG. 4, the distributed register systems 10 may receive a resource request from an entity (e.g., user or organization) through a node (e.g., user computer system 20, resource system, organization system 30, 40, 50, or the like). For example, a user 4 may be utilizing a user computer system 20 in order to access a distributed register system 10 to make a request with respect to a resource. The resource request may be the user 4 (or a system automatically) requesting to access resource information about a resource stored on the distributed register, store resource information about the resource on the distributed register, and/or provide the resource information to a third-party for various purposes.

The resource information may be resource configuration information, such as the type of resource, listing of all of the components within the resource, any regulations related to the resource, or the like. For example, when the resource is a vehicle, the resource configuration information may relate to the brand, model, trim package, style, time since the resource was produced, mileage, or the like of the vehicle. In other examples, the resource configuration information may include a listing of the type, style, production date of the component, or the like of all of the components currently within the vehicle. In still other examples, the resource configuration information may include the registration, inspection, plate number, state location, or the like status of the vehicle. Moreover, the resource information may be resource event information. For example, with respect to a vehicle, the resource event information may include information about the original sale (e.g., price, date, location, title holder), subsequent resales, accidents, repairs, warranty claims, past history of changes in the resource configuration information, or the like. The resource information may further include resource performance information and/or resource threshold information. For example, resource performance information may relate to the operation of the resource, the components thereof, or the like. In additional examples, the threshold information for a vehicle may include thresholds for when particular resource events need to occur, such as preventative maintenance schedule, operating thresholds (e.g., vibrations detected, overheating, engine performance, estimate life of component thresholds, or the like), or other like thresholds.

In the other embodiments, the resource request may be the user 4 (or a system automatically) requesting to send information to another entity that does not have access to the distributed register. For example, a vehicle sales entity may provide information to a perspective purchaser should the purchaser fail to have access to the distributed register.

In other embodiments, the resource request may be the user 4 (or a system automatically) requesting to store (e.g., add new, change existing, or the like) resource information on the distributed register. For example, a vehicle repair entity may store new components installed in a resource on the distributed register, a vehicle sales entity may store the sale of a new vehicle and/or owner information, a user 4 may store resale information of the vehicle, a title company may store a change in ownership with ownership information, an insurance entity may store insurance information about the vehicle and/or owner, or the like, as will be discussed in further detail herein.

In other embodiments of the invention, the resource information related to the resource request may be related to a resource agreement (e.g., single provisions, multiple provisions, or an entire resource agreement) in which two or more entities have agreed to terms with respect to the resource. In some embodiments the resource agreement may be a "smart contract." As used herein, a smart contract may refer to executable computer code or logic that may be executed according to an agreement between parties upon the occurrence of a condition precedent (e.g., a triggering event such the performance of the resource). In some embodiments, the smart contract may be self-executing code that is stored in the distributed register, where the self-executing code may be executed when the condition precedent is detected by the system on which the smart contract is stored. As such, the resource request may be related to storage, access, and/or dissemination of the resource agreement or portions thereof. In some embodiments the resource agreement may be stored in the form of one or more resource thresholds, which when triggered result in the identification of a resource suggestion and/or providing a resource notification to an entity. Consequently, the resource request may be related to resource performance information that may or may not meet a resource threshold, which may result in the identification of a resource suggestion and/or a resource notification, as will be discussed in further detail with respect to FIG. 5.

Block 320 of FIG. 4 illustrates that the distributed register system 10 may also receive from an entity (e.g., a user 4, organization, or the like) and/or a system (e.g., user system 20, organization system, or the like) a resource identifier related to a resource for the resource request (e.g., to access, store, provide, or the like resource information about the resource). The resource identifier may be provided during, before, or after receiving the resource request. The resource identifier may be any type of identifier (e.g., string of characters—such as numbers, letters, symbols, or the like, barcodes, QR codes, or any other types of identifier) that is used to identify a particular resource that is being tracked through the use of the distributed register. The resource identifier may be a unique identifier in order to identify a vehicle that is tracked through the distributed register. In some embodiments, the resource identifier may be a Vehicle Identification Number (VIN) for the vehicle. For example, since the VIN is a unique number for each vehicle given at the time the vehicle is produced, it can be used with a distributed register to track vehicle information related to the vehicle. It should be understood that the VIN may include the vehicle information for the vehicle (e.g., the components, trim package, manufacturing information, such as manufacturing line, manufacturing information, components installed, component information, or the like). Moreover, the resource identifier may be a component number (e.g., part number) for a single component (e.g., single part) or may relate to a group of components (e.g., assembly of parts). Consequently, the resource identifier may be any type of identifier that may be universally utilized to store resource information related to the resource and/or the components thereof. It should be understood that the distributed register may also be used to replace a manufacturer's statement of origin (MSOs), which is the paperwork that lists vehicle information related to its manufacture and/or ownership.

FIG. 4 further illustrates in block 330 that the distributed register system may authenticate the entity (e.g., user 4 and/or organization) and/or a particular node (e.g., organization system and/or user system) for allowing access to the distributed register, for making the resource request for a particular resource. The authentication may include utilizing the rules previously discussed herein in order to determine the entity and/or system (e.g., node) that is trying to access the distributed register. The identity of the entity and/or node may be based on a user identifier and/or node identifier. The distributed register system may be able to restrict and/or allow the entity and/or node to access the distributed register for the resource request for the selected resource. As such, the distributed register system is able to use the rules to regulate what entity, such as what user 4, what company, and/or what systems of the entity can take what actions on the distributed register with respect to what resources. For example, a vehicle seller/maintenance entity may be able to store resource information related to events such as making repairs to a vehicle, transferring ownership or title of the vehicle, storing loan information for the vehicle, or the like. However, alternatively, a vehicle insurer entity may only be able to store proof of insurance validation for a vehicle, but may only be allowed to access all information for the vehicle (e.g., maintenance history, accident history, or the like) in order to determination a valuation for the vehicle. In other examples, a financial institution may only be able to store loan information for the vehicle but may be able to access all other information for the vehicle in order to aid in determining valuation and/or loan terms for the vehicle.

Block 340 in FIG. 4 illustrates that when the entity (e.g., user 4, company, or the like) and/or node are authenticated the resource request is completed (e.g., the action requested by the resource request is taken). Completing the resource request may include storing the resource information for the resource, for example, storing the resource configuration information, resource event information, resource threshold information, or the like for the resource (e.g., for a vehicle). In one example, the resource configuration information being stored may be the manufacturer storing the make and model, the vehicle configuration (e.g., trim packages, upgrades, and/or other add-ons) as well as the information for components of the vehicle (e.g., which may be determined from the VIN number or provided separately). The configuration being stored may further include the details (e.g., price, owner, delivery, or the like) regarding the sale of the vehicle to a vehicle seller (e.g., dealership) or otherwise directly to an owner. As such, the distributed register entry may be created for the vehicle (e.g., genesis entry 200 as previously described herein) using the vehicle identifier (e.g., VIN number, or the like). It should be understood that the VIN number may be associated with the distributed register entry, or the VIN number, or a portion thereof, may be used in the root hash, as described with respect to FIG. 3. The distributed register entry (or a subsequent entry) may include inspection and registration information made by the vehicle seller (or a subsequent purchaser). It should be further understood, should the vehicle be damaged, involved in an accident, be upgraded, or the like, these events may be submitted to the distributed register with subsequent entries (e.g., as described with respect to FIG. 3 herein). As such, any accident reports, or the information therein, may be stored in distributed register entries. Moreover, should the vehicle undergo routine maintenance or undergo repairs, the resource information stored may include the day and time of the repair, the entity performing the repair (e.g., company or individual person), a component identifier for the component (e.g., part, or the like) installed for the repair, the type, manufacture, year, version, price, or the like of the component being installed (e.g., some component information may be determined from a component identifier being stored), or the like. In still other examples, the resource information may relate to the subsequent sale and transfer of the resource (e.g., the vehicle) to a new owner.

Additionally, in some embodiments, the resource request may relate to storing resource information that may be automatically captured by the resource itself. For example, the resource (e.g., vehicle) may have a resource system that may act as a node (e.g., if it can connect to the network 2) or a system operatively coupled to the vehicle may act as a node (e.g., monitoring system operatively coupled to the OBD port described below). Alternatively, a user 4 (e.g., the owner, a repair entity, or the like) may periodically connect to a vehicle on-board diagnostic (OBD) port in order to provide resource information to the distributed register through an entity system (e.g., user computer system 20, organization system, or the like). As such, the resource information may be performance information related to the operation of the vehicle or a component thereof. The performance information may be captured and provided manually or automatically to the distributed register. For example, operating information, such as the functioning of the components of the vehicle (e.g., engine performance, life of the battery, filter effectiveness, or the like), or the operation of the vehicle (e.g., acceleration, deceleration, speeds, force when making turns, braking patterns, or the like) may be captured and stored in the decentralized register for a number of purposes, as will be described in further detail with respect to block 360 and/or with respect to FIG. 5 below.

The completion of the resource requests through the resource actions described above may be associated with the resource identifier (e.g., the VIN of the vehicle, or the like) such that a complete history of resource information related to the resource (e.g., vehicle, other equipment, or the like) may be captured and used for later use, as described with respect to block 360 below.

As further illustrated by block 350 of FIG. 4, the resource requests and the resource actions taken with respect to the resource requests described with respect to block 340 may require verification. Verification of the distributed register entry may be determined by the rules previously discussed herein. In some embodiments, the distributed register entry may be verified as previously discussed herein with respect to FIG. 3. In some embodiments, verification may be required for storing sale of the resource, repair of the resource, inspections, or the like. For example, the owner and the entity (e.g., repair entity, inspection entity, or the like) may be required to confirm that the action actually took place before the distributed register entry may become a part of the distributed register. Moreover, the entry may be required to be verified by a third-party (e.g., comparing the entry with other entries to make sure there are no conflicting entries for the same resource). In some embodiments, it should be understood that third-party entity verification may not be required. For example, if the resource information is automatically captured and entered into the distributed register, such as with respect to the operation of the vehicle (e.g., captured through communication from the vehicle or system coupled to the vehicle), the resource information related to the operation of the vehicle may not require third-party verification (e.g., separate verification of the entry apart from verification of the vehicle or entity providing the operating information).

It should be understood that the verification of the resource request may be a check and balance on the distributed register. In one embodiment, with respect to the transfer (e.g., sale, or the like) of a resource (e.g., a vehicle, or the like) and related resource request for storing the resource information about the transfer in the distributed register, verification may be required by multiple parties. For example, a resource seller and resource purchaser may enter into an agreement for the transfer of a resource from the seller to the purchaser through the use of a financing entity. This interaction involving three-entities may require verification from all three entities, such as the seller, purchaser, and third-party financer. The resource transfer may only be stored in the distributed leger after the agreements have been executed (e.g., using smart contracts, or the like), the resources have been verified (e.g., existence of the vehicle is confirmed, such as confirmed as existing on the distributed register), and the funds have been transferred (e.g., financer funds to the seller, initial payment from the purchaser to the financer, or the like). In some embodiments, confirmation of the location of the resource may also be required (e.g., GPS used to verify the location of the resource).

FIG. 4 further illustrates in block 360 that a plurality of entities may be allowed to access the decentralized register entries in order to allow the entities to take various actions, including capturing resource information and/or sending the resource information to third-party entities for various purposes. For example, financing entities may access the distributed register to identify the owner and/or location of a resource, in order audit the collateral for any loans provided to an entity (e.g., dealership, owners, etc.). In other examples, potential purchasing entities or financing entities of a loan for a purchasing entity may review the distributed register to determine repair history, sales history, or the like of vehicle in order to identify any potential issues associated with the resource before a purchasing entity makes a purchase or a financing entity provides a loan. For example, the entities may be able to determine if the resource has been maintained properly based on preventative maintenance, if the resource has been structurally damaged based on police reports and/or resource maintenance (e.g., salvage reports, etc.), if the resource frequently breaks down (e.g., based on the number of repairs), if the resource has had operating issues in the past (e.g., breakdowns, operated outside of recommended operating threshold, or the like). As such, entities may use the distributed register in order to value the resource and/or depreciate the resource for accounting purposes. It should be also understood that in some embodiments the valuation may be further based on the transfer of other like resources that may be stored within the distributed register. For example, sales of similar used resources (e.g., used vehicles) at auctions, between entities (e.g., between dealerships, users, or the like) may set the market value for the resource. Consequently, these resource transfers may be used to value other resources (e.g., that are being used as collateral for financing purposes). Modifications to the values may be made based on the information stored in the distributed register. For example, two vehicles may be the same make, model, and year; however, the resources may be valued differently if the records for the first vehicle within the distributed register indicate the first vehicle was properly maintained (e.g., meet all scheduled maintenance, performance of the components were within thresholds, or the like), while the second vehicle was not properly maintained (e.g., missed scheduled maintenance, performance indicates the resource was operated outside of recommended operating parameters, the components are routinely being replaced, or the like). As such, while the resources are generally the same, the first resource may be valued higher than the second resource. The distributed register, due to the centralized storage of resource information, allows for the determination of valuation of the resources without having to inspect the resource in person or access the records of the current owner onsite (e.g., at a dealership, or the like). In other examples, insurance entities may be able to view ownership of the resource, maintenance of the resource over time, operation of the resource or other resources (e.g., is the current owner a safe driver based on past history, or the like), or the like in order to aid in setting insurance premiums. Furthermore, the entities may be able to review and analyze the distributed register entries in order to determine what maintenance entities have successful repairs (e.g., what entities have components that fail after being installed, what entities result in the longer durations between repairs, or the like). Consequently, the distributed register may be utilized in order to rate experiences with particular repair entities. It should be understood that examples of uses for the distributed register for resources and resource information are provided only for illustrative purposes, and it should be understood that the distributed register for the resources and resource information may be utilized for any type of purpose related to tracking the resource information.

FIG. 5 illustrates a process flow for resource performance tracking 400, in accordance with embodiments of the present disclosure. Block 410 of FIG. 5 illustrates that a resource performance request (e.g., performance information request, event performance request, or the like) is received from an entity (e.g., manually from a user, automatically from a system, or the like) to receive resource information (e.g., resource performance information) for a resource. The resource performance request may be a request for resource performance information related to a vehicle. For example, the performance information may include the operation of the resource (e.g., acceleration of the vehicle, deceleration of the vehicle, speed of the vehicle, or the like), the operation of components of the resource (e.g., operation of the engine, status of the battery, any warning lights regarding the components of the vehicle, or the like), the change in the operation over time of the vehicle or a component thereof (e.g., mileage since last repair, change in engine performance, change in battery light, or the like). In other examples, the resource performance request may include a request for information related to maintenance requirements (e.g., performance since last maintenance, scheduled maintenance date, time since last service), inspection date requirements, registration date requirements, component requirements (e.g., recommended maintenance for the components, replacement dates or usage requirements), or the like.

The resource request may be made by any entity, such as a user and/or an organization regardless of whether not the entity may be involved in a particular interaction with the resource. The request may be received from a user 4 manually through a user computer system 20 (e.g., node, or the like). For example, a user 4 may use a mobile device, desktop computer, laptop computer, or the like in order to make a resource performance request for a resource. Alternatively, or additionally, the request may come directly from the resource itself. For example, as previously discussed herein the resource, such as a vehicle, may include a system that is able to connect to other systems over the network 2. The system may be integral with the resource (e.g., a vehicle system), or may be a separate system (e.g., user computer system) that can be removably operatively coupled to and from the resource. For example, the system may be operatively coupled to a vehicle through the OBD or another communication component (e.g., another port, wirelessly with a vehicle computer system, or the like).

Block 420 of FIG. 5, like Block 320 of FIG. 4 illustrates that the distributed register system may also receive (e.g., automatically or manually) from the user 4 (e.g., a user computer system 20) and/or a resource system (e.g., a vehicle system), a resource identifier related to a resource for the resource information request (e.g., to access or provide resource performance information about the resource). The resource identifier may be provided during, before, or after making the resource performance request. As previously described herein, the resource identifier may be any type of identifier (e.g., string of characters—such as numbers, letters, symbols, or the like, barcodes, QR codes, or any other types of identifier) that is used to identify a particular resource that is being tracked through the use of the distributed register. In some embodiments, the resource identifier may be the VIN, as previously described herein.

FIG. 5 further illustrates in block 430 that the resource information (e.g., resource performance information, or the like) is identified. For example, the resource identifier is used to identify distributed register entries for the resource, and the resource performance request is utilized to identify the resource information needed to complete the resource performance request. For example, the distributed register entries may be scanned in order to identify the registration date of the vehicle, the date and details of the last maintenance for the vehicle, component installation date for various components in the vehicle, the engine performance, the remaining battery life, other component performance information, and/or other performance information. In some embodiments, the performance information may have been stored periodically (e.g., at a specific time interval, or the like) or in real-time (e.g., real-time or near-real time) through a connection with a network 2 through the resource itself, or through another system (e.g., a user computer system 20 connected wirelessly, through an OBD port, or the like). In some embodiments of the invention, the resource itself may be a node, and as such, the performance information for the resource may be stored within the resource system (e.g., vehicle computer system), which may be accessed to identify the performance information. Additionally, or alternatively the resource may not be a node, but may store performance information and allow the performance information to be accessed by a user computer system 20 (e.g., through a wired or wireless connection) or directly through communication over the distributed register network 1.

It should be understood that regardless of how the performance information is stored, in some embodiments the user computer system 20, entity system 30, 40, 50, and/or vehicle system is used to directly identify the resource information (e.g., resource performance information) requested, or alternatively, any of these systems may make the request to a distributed register system 10 and the distributed register system 10 may identify the resource information (e.g., resource performance information).

Furthermore, as illustrated by block 440, resource thresholds may be identified. The resource threshold may comprise event thresholds, performance thresholds, or the like. The event thresholds may be the registration requirements, inspection requirements, maintenance requirements, or the like (e.g., data, time period from last, or the like). The performance thresholds may comprise engine operation thresholds (e.g., vibration threshold, RPM, or the like), average miles per hour, battery threshold (e.g., 20% remaining), component operation thresholds (e.g., based on mileage, or the like), or the like. The resource thresholds may be stored inside the distributed register or outside of the distributed register, such as on various systems of the entities. As such, the resource thresholds may be different for different entities, such as one maintenance entity may recommend changing a component after X time, while a second maintenance entity may recommend changing a component after Y time (e.g., different than X time). Alternatively, or additionally, the resource thresholds, or some of the resource thresholds may be stored within the distributed register regardless if they are specific to one or more entities (e.g., recommended maintenance schedules or universal for all, such as yearly registration requirements). It should be further understood that the resource thresholds may be based on the resource agreements previously discussed herein (e.g., smart contracts, or the like). For example, the transfer (e.g., sale, lease, renting, use, or the like) of a resource may be based on compliance with the terms of an agreement. As previously discussed herein, the terms of the agreement may be set as thresholds. The resource thresholds may be related to performing regular maintenance, keeping the resource within a pre-defined location, only using the resource for the defined use (e.g., for particular tasks, or the like), setting payment requirements (e.g., payment amounts, payment dates, or the like), or the like, and such resource thresholds may be stored in the distributed register. As such, the resource thresholds for compliance with a resource agreement may be identified for analysis with respect resource information identified for a resource.

FIG. 5 further illustrates in block 450 that a comparison is made between the resource information identified and the resource thresholds for the resource from which the resource information was identified. As such, a determination may be made if the resource information captured from the resource is outside of the resource threshold. For example, a determination may be made that the engine operation is outside of a desired threshold, the registration of a vehicle is going to expire within a set time period, the scheduled maintenance date is approaching or past due (e.g., scheduled oil change, 30K mile checkup, or the like), the battery life has fallen below 20% remaining, or the like. It should be understood that the comparison may be performed by one or more individual entities, such as based on the relationship the entity has with the resource or the owner of the resource. Alternatively, or additionally, at least some of the comparisons may be made by a centralized entity, such as an entity that may in responsible to provide a comparison of resource information and resource thresholds to a plurality of entities when requested. With respect to the compliance with a resource agreement, the performance of the resource, such as logging regular maintenance, keeping the resource within a pre-defined location, only using the resource for the licensed use (e.g., for particular tasks, or the like), making timely payments, or the like may be compared with the resource threshold for the resource agreement.

Block 460 of FIG. 5 further illustrates that a resource suggestion may be determined based on the comparison of the resource information and the resource threshold. For example, when a component of the vehicle is approaching or has reached its life (e.g., based on use of the component, mileage of the vehicle, or the like) the resource suggestion may be to replace the component by a particular date, time, or operation milestone of the resource (e.g., at a particular mileage reading). In other examples, should the engine be operating outside of threshold, the resource suggestion may be to schedule maintenance on the resource. In still other examples, the resource suggestion may include setting up an inspection time, setting reminders for the payment of registration payments. In other examples, the resource suggestion may relate to triggering events that may occur should the resource performance not meet a resource agreement threshold. The triggering events may include return of the resource, increased payments, increased payment percentages, additional payments required, additional auditing of the resource or entity using the resource, reduced time of use for the resource, or other actions required by the resource agreement for failing to meet a resource threshold set by the resource agreement. The resource suggestion may be different based on the entity making the suggestion, as previously discussed with respect to the entity making the comparison and/or setting a resource threshold.

Block 470 further illustrates in FIG. 5 that a notification may be sent regarding the resource suggestion. It should be understood that the resource suggestion may be sent directly to the resource, such as on a display of the resource (e.g., touchscreen, screen, warning light or display on a dashboard, or the like within a vehicle). Alternatively, or additionally, the notification may be sent to an entity responsible for the resource (e.g., user owner, company owner, or the like). The notification may include one or more proposed resource suggestions and/or the one or more entities at which the responsible entity may undertake the one or more resource suggestions. For example, returning to the example where the resource suggestion is for scheduled maintenance, the proposed resource suggestions may include different types of maintenance that could be performed, the various entities at which the resource could receive maintenance (e.g., based on the location of the owner, the location of the resource, or the like), the proposed costs of the maintenance, or other like information. In other embodiments of the invention the notification related to the resource suggestion may include recommended resolutions for the owner entity. For example, with respect to an electrical, tire, light, or other like issue identified, the notification may indicate instructions for the user 4 to potentially fix the issue. In other embodiments, the notification may be an indication that the resource performance failed to meet the resource agreement threshold, and thus, may include the resource suggestion and/or indicate that the resource suggestion has been automatically implemented.

It should be further understood that the resource suggestion may include automatically scheduling an event for the resource. For example, when the resource suggestion is for maintenance, an appointment with a repair entity may be automatically set (e.g., based on preferences of the owner entity, or the like). Alternatively, should the resource suggestion be related to registration of a resource, an automatic payment may be scheduled, and a user may be notified of the scheduled automatic payment. In other examples, the automatic implementation may relate to additional payments required when the resource agreement has not been met.

In some embodiments of the disclosure, one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems, devices, or components thereof described herein. For example, a portion of the block chain application 17 may be stored on the user computer systems 20 and/or entity systems 30, 40, 50, in order to achieve the inventions described herein.

It should be understood that the systems, devices, and components described in FIGS. 1 and 2, or other devices not specifically described herein, may be configured to establish an electronic communications link with each other in order to accomplish the steps of the processes described herein. The link may be an internal link within the same entity (e.g., within the same financial institution for the nodes or components within the nodes) or an external link with the other systems of other entities (e.g., nodes or other systems controlled by other entities). The information within the block chains may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format.

Moreover, it should be understood that the process flows described herein include transforming the information sent and/or received from the applications of the different systems (e.g., internally or externally) from one or more data formats into a data format associated with the distributed register application 17 for use by the one or more users 4. There are many ways in which information is converted within the distributed computing network 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In accordance with embodiments of the invention, the terms "financial institution" and "financial entity" include any organization that processes financial transactions including, but not limited to, banks, credit unions, savings and loan associations, investment companies, stock brokerages, asses management firms, insurance companies and the like. In specific embodiments of the invention, use of the term "bank" is limited to a financial entity in which account-bearing customers conduct financial transactions, such as account deposits, withdrawals, transfers and the like.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. Patent Application Ser. No. | Title | Filed On |
|---|---|---|
| 16/831,335 | SYSTEM FOR VALIDATED TRACKING OF EVENTS ASSOCIATED WITH EQUIPMENT DURING A RESOURCE ARRANGEMENT | Concurrently herewith |
| 16/831,342 | SYSTEM FOR VALIDATED TRACKING AND MANAGEMENT OF EVENTS ASSOCIATED WITH EQUIPMENT DURING LIFETIME USAGE | Concurrently herewith |
| 16/831,447 | SYSTEM FOR TRACKING A RESOURCE MAINTENANCE AND RESOURCE CAPABILITIES | Concurrently herewith |
| 16/831,372 | SYSTEM FOR TRACKING RESOURCES WITH MULTIPLE USERS AND MULTIPLE LOCATIONS | Concurrently herewith |

What is claimed is:

1. A system for tracking resource performance of resources, the system comprising:
   one or more memory devices storing computer-readable code; and
   one or more processing devices operatively coupled to the one or more memory devices, wherein when executed the computer-readable code is configured to cause the one or more processing devices to:
   receive a performance request from a node of a plurality of nodes within a distributed register system;
   identify a resource identifier for a resource;
   identify a resource suggestion based on the performance request and resource information for the resource stored on a distributed register of the distributed register system based on the resource identifier, wherein identifying the resource suggestion comprises:
      identifying the resource information stored in the distributed register based on the resource identifier;
      identifying a performance threshold for the resource or a component of the resource based on the performance request from the node;
      comparing the resource information to the performance threshold; and
      determining the resource suggestion based on the comparison of the resource information to the performance threshold; and
   provide a notification of the resource suggestion and the resource information to an entity system, wherein the resource suggestion is for a replacement component;
   automatically order the replacement component and schedule maintenance for the resource with a maintenance entity;
   wherein the distributed register of the distributed register system stores the resource information from initiation of the resource throughout a life of the resource to verify the resource information about the resource for access by a plurality of entities, and wherein the resource information comprises at least a plurality of original components for the resource and a plurality of new components installed in the resource over time; and wherein the replacement component and the maintenance entity are optimized by searching the plurality of entities within the distributed register system for optimizing ordering of the replacement component and for optimizing the identification of the maintenance entity for scheduling maintenance for the resource.

2. The system of claim 1, wherein the resource is a vehicle.

3. The system of claim 1, wherein the resource identifier is a vehicle identification number (VIN).

4. The system of claim 1, wherein the performance request is made by an entity through the entity system.

5. The system of claim 1, wherein the performance request is made directly by the resource through a resource system.

6. The system of claim 1, wherein the performance request comprises a request to monitor performance of the resource or the component thereof.

7. The system of claim 6, wherein the performance request to monitor the performance of the resource or the component thereof, comprises monitoring the performance over a specific time period.

8. The system of claim 1, wherein the resource is a vehicle and the resource information is the use of the vehicle or the component of the vehicle, wherein the performance threshold defines when the resource or the component requires replacement or maintenance, and wherein the notification is provided when the resource information meets the performance threshold.

9. The system of claim 1, wherein the performance request is one of a plurality of performance requests, and wherein the plurality of performance requests occur automatically over a specified time period.

10. A method for tracking resource performance of resources, the method comprising:
    receiving, by one or more processing components, a performance request from a node of a plurality of nodes within a distributed register system;
    identifying, by the one or more processing components, a resource identifier for a resource;
    identifying, by the one or more processing components, a resource suggestion based on the performance request and resource information for the resource stored on a distributed register of the distributed register system based on the resource identifier, wherein identifying the resource suggestion comprises:
        identifying the resource information stored in the distributed register based on the resource identifier;
        identifying a performance threshold for the resource or a component of the resource based on the performance request from the node;
        comparing the resource information to the performance threshold; and
        determining the resource suggestion based on the comparison of the resource information to the performance threshold; and
    providing, by the one or more processing components, a notification of the resource suggestion and the resource information to an interface of an entity system, wherein the resource suggestion is for a replacement component;
    automatically order the replacement component and schedule maintenance for the resource with a maintenance entity;
    wherein the distributed register of the distributed register system stores the resource information from initiation of the resource throughout a life of the resource to verify the resource information about the resource for access by a plurality of entities, and wherein the resource information comprises at least a plurality of original components for the resource and a plurality of new components installed in the resource over time; and
    wherein the replacement component and the maintenance entity are optimized by searching the plurality of entities within the distributed register system for optimizing ordering of the replacement component and for optimizing the identification of the maintenance entity for scheduling maintenance for the resource.

11. The method of claim 10, wherein the resource is a vehicle and the resource identifier is a vehicle identification number (VIN).

12. The method of claim 10, wherein the performance request is made directly by the resource through a resource system.

13. The method of claim 10, wherein the resource is a vehicle and the resource information is the use of the vehicle or the component of the vehicle, wherein the performance threshold defines when the resource or the component requires replacement or maintenance, and wherein the notification is provided when the resource information meets the performance threshold.

14. A computer program product for tracking resource performance of resources, the computer program product comprising at least one non-transitory computer-readable medium having computer-readable program code portions embodied therein, the computer-readable program code portions comprising:
    an executable portion configured to receive a performance request from a node of a plurality of nodes within a distributed register system;
    an executable portion configured to identify a resource identifier for a resource;
    an executable portion configured to identify a resource suggestion based on the performance request and resource information for the resource stored on a distributed register of the distributed register system based on the resource identifier, wherein identifying the resource suggestion comprises:
        identifying the resource information stored in the distributed register based on the resource identifier;
        identifying a performance threshold for the resource or a component of the resource based on the performance request from the node;
        comparing the resource information to the performance threshold; and
        determining the resource suggestion based on the comparison of the resource information to the performance threshold; and
    an executable portion configured to provide a notification of the resource suggestion and the resource information to an interface of an entity system, wherein the resource suggestion is for a replacement component;
    an executable portion configured to automatically order the replacement component and schedule maintenance for the resource with a maintenance entity;
    wherein the distributed register of the distributed register system stores the resource information from initiation of the resource throughout a life of the resource to verify the resource information about the resource for access by a plurality of entities, and wherein the resource information comprises at least a plurality of original components for the resource and a plurality of new components installed in the resource over time; and wherein the replacement component and the maintenance entity are optimized by searching the plurality of entities within the distributed register system for optimizing ordering of the replacement component and for optimizing the identification of the maintenance entity for scheduling maintenance for the resource.

15. The computer program product of claim 14, wherein the resource is a vehicle and the resource identifier is a vehicle identification number (VIN).

16. The computer program product of claim 14, wherein the performance request is made directly by the resource through a resource system.

17. The computer program product of claim 14, wherein the resource is a vehicle and the resource information is the use of the vehicle or the component of the vehicle, wherein the performance threshold defines when the resource or the component requires replacement or maintenance, and wherein the notification is provided when the resource information meets the performance threshold.

\* \* \* \* \*